US 9,117,322 B2

(12) United States Patent
Hamasaki et al.

(10) Patent No.: US 9,117,322 B2
(45) Date of Patent: *Aug. 25, 2015

(54) PAPER SHEET PROCESSING APPARATUS

(71) Applicant: GLORY LTD., Himeji-shi (JP)

(72) Inventors: Hiroki Hamasaki, Hyogo (JP);
Tomohiko Kasuya, Hyogo (JP);
Kazuhiro Ohmatsu, Hyogo (JP)

(73) Assignee: GLORY LTD., Himeji-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,238

(22) Filed: Mar. 18, 2014

(65) Prior Publication Data

US 2014/0198967 A1    Jul. 17, 2014

Related U.S. Application Data

(62) Division of application No. 12/678,642, filed as application No. PCT/JP2007/068876 on Sep. 27, 2007, now Pat. No. 8,705,835.

(51) Int. Cl.
| G06K 9/00 | (2006.01) |
| G07D 7/00 | (2006.01) |
| G06K 9/20 | (2006.01) |
| G06K 9/34 | (2006.01) |
| G07D 7/12 | (2006.01) |

(52) U.S. Cl.
CPC .......... *G07D 7/0033* (2013.01); *G06K 9/00* (2013.01); *G06K 9/00469* (2013.01); *G06K 9/2054* (2013.01); *G06K 9/344* (2013.01); *G06K 9/348* (2013.01); *G07D 7/0006* (2013.01); *G07D 7/121* (2013.01); *G06K 2209/01* (2013.01)

(58) Field of Classification Search
None
See application file for complete search history.

(56) References Cited

U.S. PATENT DOCUMENTS

| 5,815,592 | A  | * | 9/1998  | Mennie et al. ............... 382/135 |
| 5,870,487 | A  |   | 2/1999  | Graves et al. |
| 6,065,672 | A  | * | 5/2000  | Haycock ...................... 235/379 |
| 6,181,812 | B1 |   | 1/2001  | Rodite |
| 7,242,796 | B2 | * | 7/2007  | Matsui et al. ................ 382/135 |
| 7,248,730 | B2 | * | 7/2007  | Matsui et al. ................ 382/135 |
| 7,866,545 | B2 |   | 1/2011  | Rapf et al. |
| 7,899,233 | B2 | * | 3/2011  | Kagehiro et al. ............. 382/135 |
| 2003/0059098 | A1 | * | 3/2003 | Jones et al. .................. 382/135 |
| 2004/0028266 | A1 | * | 2/2004 | Jones et al. .................. 382/135 |
| 2007/0122023 | A1 | * | 5/2007 | Jenrick et al. ................ 382/135 |
| 2010/0202680 | A1 | * | 8/2010 | Hamasaki et al. ............ 382/137 |
| 2012/0308137 | A1 | * | 12/2012 | Hamasaki .................... 382/181 |

FOREIGN PATENT DOCUMENTS

| DE | 102 01 987 A1 | 7/2003 |
| EP | 1780636 A2    | 5/2007 |

(Continued)

*Primary Examiner* — Andrae S Allison
(74) *Attorney, Agent, or Firm* — Foley & Lardner LLP

(57) ABSTRACT

A paper sheet processing apparatus that performs a recognizing process of a paper sheet includes: a paper sheet recognition sensor (11) that reads an image of a paper sheet; a number-attribute information memory (131) that stores number attribute information including number recognition conditions for recognizing a number given to a paper sheet; and an image processing unit (134) and a character recognizing unit (135) that recognize a number of a paper sheet from an image read by the paper sheet recognition sensor (11), based on number recognition conditions stored in the number-attribute information memory (131).

10 Claims, 13 Drawing Sheets

(56) References Cited

FOREIGN PATENT DOCUMENTS

| | | |
|---|---|---|
| JP | 62-280993 A | 12/1987 |
| JP | 04-131986 A | 5/1992 |
| JP | 08-007151 A | 1/1996 |
| JP | 09-245218 A | 9/1997 |
| JP | 10-154256 A | 6/1998 |
| JP | 11-025313 A | 1/1999 |
| WO | WO-00/05688 A1 | 2/2000 |
| WO | WO-01/86581 A1 | 11/2001 |
| WO | WO-2006/005475 A1 | 1/2006 |

* cited by examiner

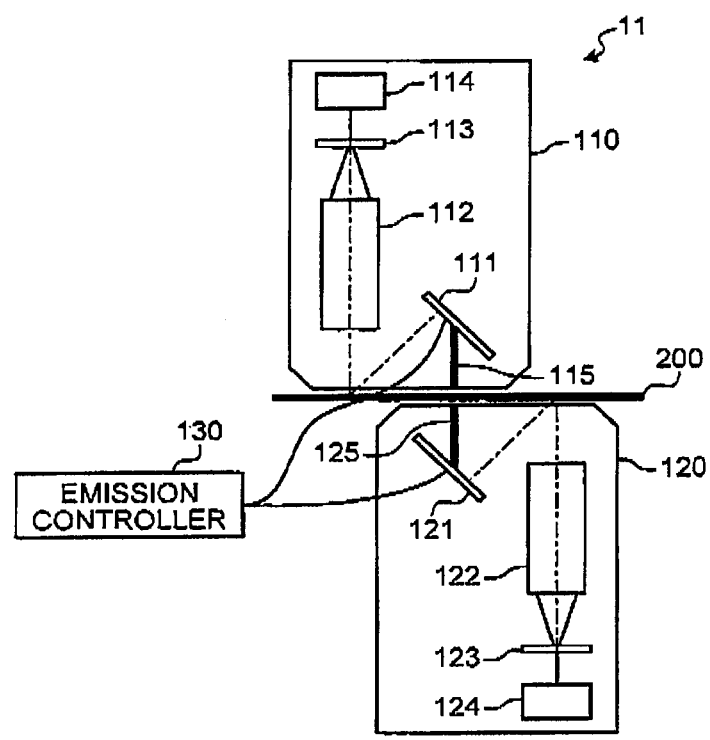

FIG.3

| CURRENCY TYPE | DENOM-INATION | PRIORITY TO PREDETERMINED POSITION | SIZE CHANGE | ROTATION |
|---|---|---|---|---|
| US DOLLAR | 1 | YES/NO | YES/NO | YES/NO |
| | 2 | YES/NO | YES/NO | YES/NO |
| | ... | ... | ... | ... |
| | 100 | YES/NO | YES/NO | YES/NO |
| EURO | 5 | YES/NO | YES/NO | YES/NO |
| | 10 | YES/NO | YES/NO | YES/NO |
| | ... | ... | ... | ... |
| | 500 | YES/NO | YES/NO | YES/NO |
| JAPANESE YEN | 1000 | YES/NO | YES/NO | YES/NO |
| | 2000 | YES/NO | YES/NO | YES/NO |
| | ... | ... | ... | ... |
| | 10000 | YES/NO | YES/NO | YES/NO |
| CHINESE YUAN | 1 | YES/NO | YES/NO | YES/NO |
| | 2 | YES/NO | YES/NO | YES/NO |
| | ... | ... | ... | ... |
| | 100 | YES/NO | YES/NO | YES/NO |
| SINGAPORE DOLLAR | 1 | YES/NO | YES/NO | YES/NO |
| | 2 | YES/NO | YES/NO | YES/NO |
| | ... | ... | ... | ... |
| | 100 | YES/NO | YES/NO | YES/NO |

FIG.6

| CURRENCY TYPE | DENOM-INATION | MULTIPLE-MATCHING | NUMBER OF MATCHED CHARACTERS | CHARACTER FONT DIFFERENCE |
|---|---|---|---|---|
| US DOLLAR | 1 | YES/NO | 10 | YES/NO |
| | 2 | YES/NO | 10 | YES/NO |
| | ... | ... | ... | ... |
| | 100 | YES/NO | 10 | YES/NO |
| EURO | 5 | YES/NO | 10 | YES/NO |
| | 10 | YES/NO | 10 | YES/NO |
| | ... | ... | ... | ... |
| | 500 | YES/NO | 10 | YES/NO |
| JAPANESE YEN | 1000 | YES/NO | 10 | YES/NO |
| | 2000 | YES/NO | 10 | YES/NO |
| | ... | ... | ... | ... |
| | 10000 | YES/NO | 10 | YES/NO |
| CHINESE YUAN | 1 | YES/NO | 8 | YES/NO |
| | 2 | YES/NO | 8 | YES/NO |
| | ... | ... | ... | ... |
| | 100 | YES/NO | 8 | YES/NO |
| SINGAPORE DOLLAR | 1 | YES/NO | 9 | YES/NO |
| | 2 | YES/NO | 9 | YES/NO |
| | ... | ... | ... | ... |
| | 100 | YES/NO | 9 | YES/NO |

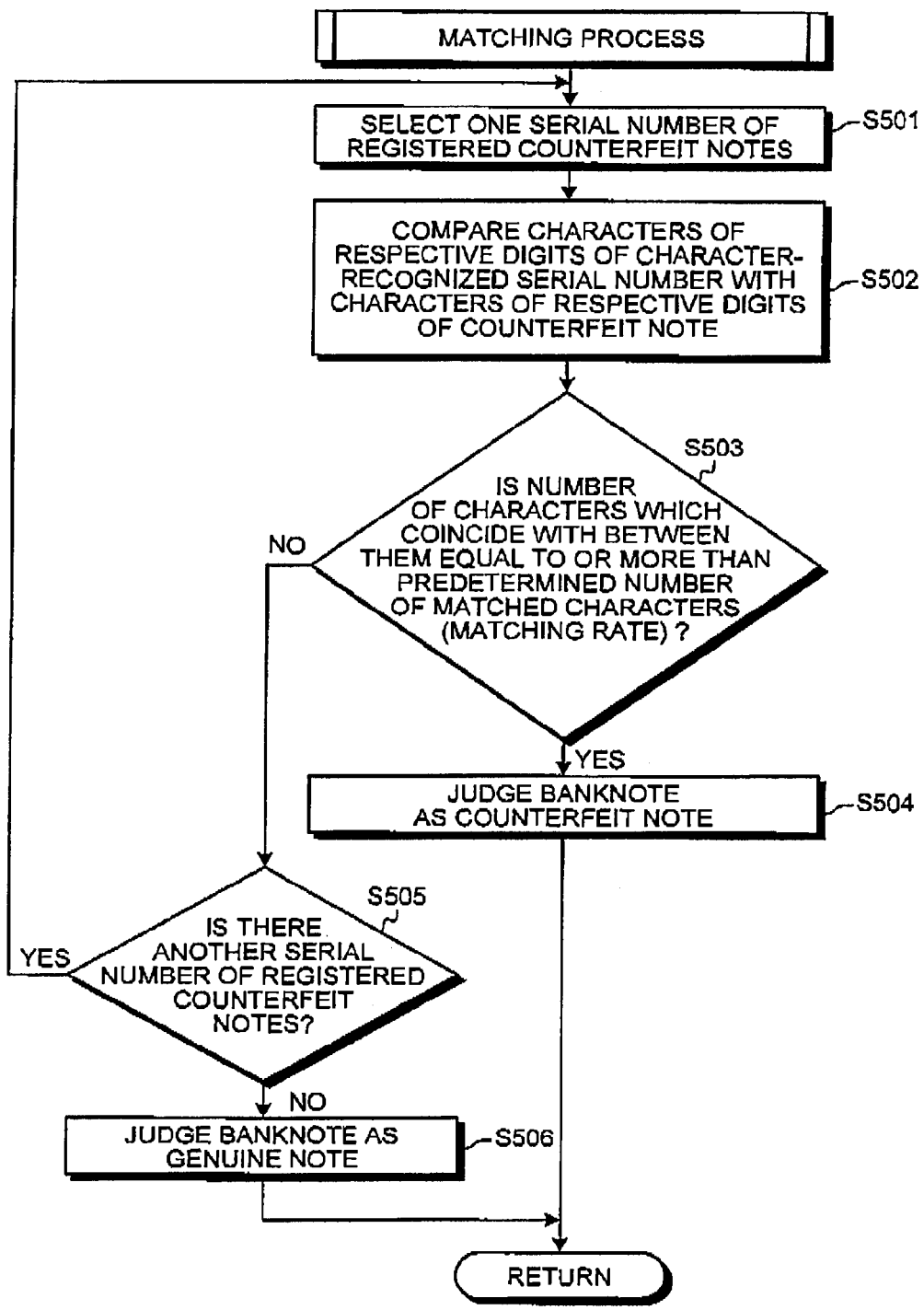

PAPER SHEET PROCESSING APPARATUS

CROSS-REFERENCE TO RELATED APPLICATIONS

This application is a divisional application of U.S. application Ser. No. 12/678,642 filed Mar. 17, 2010, now U.S. Pat. No. 8,705,835, issued Apr. 22, 2014, which is the National Stage Application of International Application No. PCT/JP2007/068876, filed Sep. 27, 2007, the entire contents of all are incorporated herein by reference.

TECHNICAL FIELD

The present invention relates to a paper sheet processing apparatus that recognizes paper sheets such as banknotes, checks, bank drafts, and gift certificates.

BACKGROUND ART

Conventionally, in an apparatus that performs authentication of banknotes, there has been known an apparatus that stores serial numbers of counterfeit notes such as duplicate notes and forged notes in a memory, to compare and match a serial number read from a taken-in banknote with serial numbers of counterfeit notes stored in the memory, and when the serial number of the taken-in banknote coincides with a serial number of a counterfeit note, judges that the taken-in banknote is a counterfeit note (see, for example, Patent Document 1). Further, to increase the detection accuracy of counterfeit notes, judgment of the length, magnetic pattern, and image pattern of the banknote is also performed as well as the serial number, and when it is judged that the banknote is genuine in all judgment processes, the taken-in banknote is judged to be genuine and valid.

Furthermore, conventionally, with respect to a system in which automatic teller machines of a banking facility are connected to a host computer, there has been proposed a technique in which each of the automatic teller machines records a serial number of a deposited or dispensed banknote in association with an account number of a person who deposits or withdraws money, and the host computer reads information recorded by the automatic teller machine to perform various types of analyses such as a circulation analysis of banknotes and extraction of stolen banknotes (see, for example, Patent Document 2).

Patent Document 1: Japanese Laid-open Patent Publication No. H8-7151
Patent Document 2: Japanese Laid-open Patent Publication No. H4-131986

DISCLOSURE OF INVENTION

Problem to be Solved by the Invention

There are various types of counterfeit notes. For example, as counterfeit notes, there have been known those in which two or three digit parts of either the head or the tail of the serial numbers judged to be counterfeit notes are modified. In recognition of such counterfeit notes, judging a banknote having a serial number coinciding with the serial number already judged as that of a counterfeit note at a predetermined ratio or higher as a counterfeit note is an effective method for reducing a risk of accepting counterfeit notes for the owner of a paper sheet recognition apparatus.

Besides, in countries using banknotes in which serial numbers are printed on left and right sides on one face of a banknote, there are counterfeit notes in which a valid banknote and a forged banknote are elaborately patched together at a half position of the banknote, and those in which halves of valid banknotes are elaborately patched together. In such cases, various measures can be considered as a recognition method of the serial number, such as recognition is performed by reading only one of the serial numbers in a plurality of areas or by reading all the serial numbers, and in the latter case, judgment whether or not a plurality of read serial numbers coincides with those of the counterfeit notes is performed.

In this way, in actual recognition of serial numbers of banknotes, judgment of the serial numbers needs to be performed in consideration of various situations. In the conventional technique, however, there is a problem such that judgment can be performed based only on a single standard whether or not the banknote has a serial number coinciding with a pre-registered serial number.

Furthermore, although not a counterfeit note, there is a banknote in which numbers of a serial number are printed in different sizes so that the size thereof becomes wider towards the tail, such as serial numbers of the banknotes used in Malaysia and Singapore, for preventing banknote counterfeiting. Judgment of a serial number in a conventional case in which the size of the serial number of the banknote is uniform is performed such that clipping of a serial number portion is performed, segmentation of that area is performed, and matching to a dictionary of character fonts prepared beforehand is performed to thereby achieve character recognition. However, there is a problem such that this character recognition method cannot be applied to a banknote in which numbers of its serial number are printed in different sizes.

Further, in a conventional paper sheet recognition apparatus, when it is used to process various foreign banknotes by the paper sheet recognition apparatus that performs authentication of banknotes used in Japan, for example, the paper sheet recognition apparatus cannot be used as it is, and another paper sheet recognition apparatus suitable for the specific processing purpose needs to be developed each time, and therefore the efficiency is very poor. In addition, as there are various type of checks and gift certificates, and there can be the same problems as those with respect to banknotes described above.

The present invention has been achieved to solve the problems in the conventional techniques, and an object of the present invention is to provide a paper sheet processing apparatus that can arbitrarily set or change recognition conditions and authentication conditions of numbers, with respect to paper sheet processing apparatuses that recognize serial numbers of banknotes and numbers of checks and gift certificates, and authenticate paper sheets according to a recognized number or the like.

Means for Solving Problem

To achieve the object, a paper sheet processing apparatus according to the present invention performs a recognizing process of a paper sheet, and includes an image reader that reads an image of a paper sheet; a number-attribute-information memory that stores number recognition conditions for recognizing a number given to the paper sheet; and an image processing unit/character recognizing unit that recognizes a number of the paper sheet from an image read by the image reader, based on the number recognition conditions stored in the number-recognition condition memory.

In the paper sheet processing apparatus according to the present invention, the number recognition conditions in the number-recognition condition memory are sorted by country or by kind of paper sheet and stored.

The paper sheet processing apparatus according to the present invention further includes a recognition-condition setting unit that sets or changes number recognition conditions in the number-recognition condition memory.

The paper sheet processing apparatus according to the present invention further includes a communication interface unit that communicates with another information processing terminal connected via a communication line, wherein the number recognition conditions set in the number-recognition condition memory are set or changed by the another information processing terminal via the communication interface unit.

In the paper sheet processing apparatus according to the present invention, the image processing unit/character recognizing unit includes an image processing unit that clips an image of a number portion from an image of the paper sheet read by the image reader; and a character recognizing unit that recognizes a number of the paper sheet from an image of, the number portion clipped by the image processing unit.

In the paper sheet processing apparatus according to the present invention, the number recognition conditions stored in the number-recognition condition memory include priority-to-predetermined-position information indicating whether to recognize a number at a predetermined position, of numbers given to the paper sheet, by the character recognizing unit, or to recognize numbers at a plurality of positions given to the paper sheet by the character recognizing unit.

In the paper sheet processing apparatus according to the present invention, the number recognition conditions stored in the number-recognition condition memory include size change information indicating whether to perform a size changing process on an image of the number portion clipped by the image processing unit.

In the paper sheet processing apparatus according to the present invention, the number recognition conditions stored in the number-recognition condition memory include rotation information indicating whether or not to perform a rotation process of an image of the number portion clipped by the image processing unit.

The paper sheet processing apparatus according to the present invention further includes an authentication unit that performs authentication of the paper sheet by using a number given to the paper sheet, which is recognized by the image processing unit/character recognizing unit.

To achieve the object, a paper sheet processing apparatus according to the present invention performs authentication of a paper sheet, and includes an image reader that reads an image of the paper sheet; an image processing unit/character recognizing unit that recognizes a number given to the paper sheet from an image read by the image reader: an authentication condition memory that stores authentication conditions for performing authentication of the paper sheet by using a number of the paper sheet recognized by the image processing unit/character recognizing unit; and a matching unit that performs matching for authentication of the paper sheet based on the authentication conditions stored in the authentication condition memory.

In the paper sheet processing apparatus according to the present invention, the authentication conditions in the authentication condition memory are sorted by country or by kind of paper sheet and stored.

The paper sheet processing apparatus according to the present invention further includes an authentication-condition setting unit that sets or changes the authentication conditions in the authentication condition memory.

The paper sheet processing apparatus according to the present invention further includes a communication interface unit that communicates with another information processing terminal connected via a communication line, wherein the authentication conditions set or changed by the another information processing terminal are set in the authentication condition memory via the communication interface unit.

In the paper sheet processing apparatus according to the present invention, the image processing unit/character recognizing unit includes an image processing unit that clips an image of a number portion from an image of the paper sheet read by the image reader; and a character recognizing unit that recognizes a number of the paper sheet from an image of the number portion clipped by the image processing unit.

In the paper sheet processing apparatus according to the present invention, when a plurality of numbers are printed on the paper sheet, the matching unit performs a matching process based on the authentication conditions, with respect to the serial numbers recognized by the character recognizing unit.

In the paper sheet processing apparatus according to the present invention, the authentication conditions stored in the authentication condition memory include multiple-matching information indicating whether or not perform matching between a plurality of numbers, when a plurality of numbers are printed on the paper sheet, and the matching unit has a multiple-numbers matching function for performing a matching process between the numbers, when the multiple matching information is set to perform matching between the numbers.

In the paper sheet processing apparatus according to the present invention, the authentication conditions stored in the authentication condition memory include a reference number of matched characters indicating number of matched characters between respective digits of the plurality of numbers, which becomes a criterion for judging that a paper sheet recognized by the image processing unit/character recognizing unit is not a counterfeit note, and when the number of matched characters between respective digits of the numbers is equal to or larger than the reference number of matched characters, the multiple numbers matching function judges that the paper sheet recognized by the image processing unit/character recognizing unit is not a counterfeit note.

The paper sheet processing apparatus according to the present invention further includes a counterfeit note number memory that stores counterfeit note numbers, which are numbers of counterfeit paper sheets, wherein the matching unit has a counterfeit note-number matching function for judging whether or not the paper sheet is a counterfeit note by matching a number of the paper sheet recognized by the image processing unit/character recognizing unit to the counterfeit note numbers in the counterfeit note number memory.

In the paper sheet processing apparatus according to the present invention, the authentication conditions stored in the authentication condition memory include a reference number of matched characters indicating number of matched characters between respective digits of the counterfeit note numbers and a number printed on the paper sheet, which becomes a criterion for judging that the paper sheet recognized by the image processing unit/character recognizing unit is a counterfeit note, and when the number of matched characters between the number of the paper sheet recognized by the image processing unit/character recognizing unit and the counterfeit note numbers in the counterfeit note number memory is equal to or larger than the reference number of matched characters, the counterfeit note-number matching function judges that the paper sheet is a counterfeit note.

The paper sheet processing apparatus according to the present invention further includes a font-recognition information memory that stores font recognition information in which a font used for a number of a genuine paper sheet is associated with a kind of the paper sheet, wherein the character recognition function of the image processing unit/character recognizing unit further includes a function for judging whether a font of the recognized number of the paper sheet is different from font recognition information corresponding to the kind of paper sheet in the font recognition information memory.

In the paper sheet processing apparatus according to the present invention, the authentication conditions stored in the authentication condition memory include font difference information indicating whether or not to discriminate a difference between a font of the paper sheet to be authenticated from that of a genuine paper sheet for a recognizing process performed by the character recognition function using the information stored in the font-recognition information memory.

In the paper sheet processing apparatus according to the present invention, the paper sheet is a banknote, and the number of the paper sheet is a serial number printed on a banknote.

Effect of the Invention

According to the present invention, number recognition according to the type of a paper sheet can be performed in paper sheet processing using serial numbers.

According to the present invention, one type of paper sheet processing apparatus can handle banknotes of a plurality of countries or of denominations, without developing a new logic or adding another logic. Accordingly, the development efficiency of the paper sheet processing apparatus can be increased.

According to the present invention, an administrator can arbitrarily set conditions of paper sheet processing for each apparatus, according to the location where the paper sheet processing apparatus is installed.

According to the present invention, a plurality of paper sheet processing apparatuses can be controlled remotely, and control of the paper sheet processing apparatuses installed widely can be facilitated.

According to the present invention, serial numbers for recognizing paper sheets can be reliably clipped according to the type of a paper sheet to be recognized.

According to the present invention, when recognition is performed, the accuracy or speed in paper sheet recognition can be selected.

According to the present invention, even if there is a small character of a number, of which characters are printed in different sizes, the size of the character can be enlarged for recognition.

According to the present invention, even when an orientation of a clipped number is different from that of the characters as a criterion, handling the paper sheet is enabled.

According to the present invention, authentication of the recognized paper sheet can be performed.

According to the present invention, an authentication matching process according to the type of the paper sheet can be performed in paper sheet processing using serial numbers.

According to the present invention, one type of paper sheet processing apparatus can handle banknotes of a plurality of countries or of denominations, without developing a new logic or adding another logic. Accordingly, the development efficiency of the paper sheet processing apparatus can be increased.

According to the present invention, an administrator can arbitrarily set matching conditions of paper sheets for each apparatus, according to the location where the paper sheet processing apparatus is installed.

According to the present invention, a plurality of paper sheet processing apparatuses can be controlled remotely, and control of the paper sheet processing apparatuses installed widely can be facilitated.

According to the present invention, serial numbers for recognizing paper sheets can be reliably clipped according to the type of a paper sheet to perform a matching process.

According to the present invention, even if one paper sheet is formed by patching a plurality of paper sheets, it can be judged to be a counterfeit note.

According to the present invention, when a plurality of numbers are printed on a paper sheet, the authentication accuracy of the paper sheet can be increased by checking if these numbers coincide with each other.

According to the present invention, authentication of a paper sheet can be performed, taking into consideration a case that there is an unrecognizable character in a plurality of numbers on the paper sheet.

According to the present invention, a damage due to counterfeit notes widely circulated can be prevented by comparing and matching with numbers known as counterfeit notes in authentication of paper sheets.

According to the present invention, a criterion for judging a paper sheet as a counterfeit note can be arbitrarily changed, and authentication setting can be performed according to the location where the paper sheet processing apparatus is installed.

According to the present invention, the authentication accuracy can be further increased by taking into consideration a difference of character fonts used for numbers in addition to coincidence of numbers.

According to the present invention, in number judgment of a paper sheet, it can be set whether highly accurate authentication is to be performed by including the difference of character fonts, or authentication is performed faster in processing time and without including the difference of character fonts.

According to the present invention, recognition and authentication of paper sheets widely circulated as paper sheets can be performed quickly.

BRIEF DESCRIPTION OF DRAWINGS

FIG. 2 is a schematic diagram of a configuration example of a paper sheet recognition sensor.

FIG. 3 is an example of number recognition conditions.

FIG. 4-1 is a schematic diagram of a banknote example.

FIG. 4-2 is a schematic diagram of a banknote example.

FIG. 6 is an example of authentication conditions.

FIG. 13 is a flowchart of an example of a matching process procedure in FIG. 8.

EXPLANATIONS OF LETTERS OR NUMERALS

Figure 1:
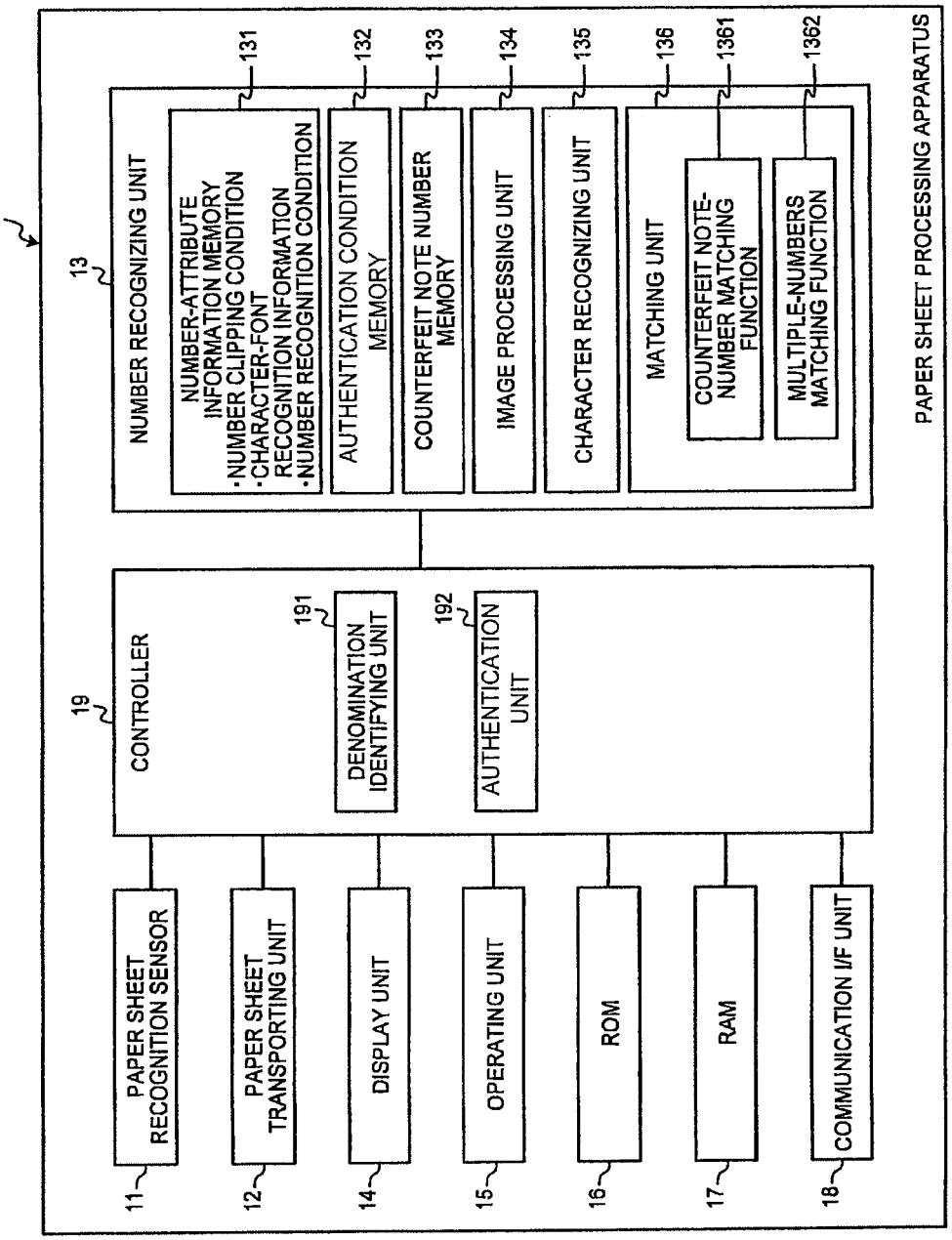
FIG. 1 is a schematic block diagram of a functional configuration of a paper sheet processing apparatus according to an embodiment of the present invention.

10 Paper sheet processing apparatus
11 Paper sheet recognition sensor
12 Paper sheet transporting unit
13 Number recognizing unit
14 Display unit
15 Operating unit
18 Communication I/F unit
19 Controller
110 First line sensor
111, 121 Reflective light source
112, 122 Lens
113, 123 Light receiving unit
114, 124 A/D converter
115, 125 Blocking unit
120 Second line sensor
121 Reflective light source
123 Light receiving unit
130 Emission controller
131 Number-attribute information memory
132 Authentication condition memory
133 Counterfeit note number memory
134 Image processing unit
135 Character recognizing unit
136 Matching unit
191 Denomination identifying unit
192 Authentication unit
200 Banknote
211, 212, 213 Serial number
1361 Counterfeit note-number matching function
1362 Multiple-numbers matching function

BEST MODE(S) FOR CARRYING OUT THE INVENTION

Exemplary embodiments of a paper sheet processing apparatus according to the present invention will be explained below in detail with reference to the accompanying drawings. In the following embodiments, a case that the present invention is applied to recognition of banknotes is explained. However, the present invention is not limited to the embodiments, and can be also applied to general paper sheets such as checks, bank drafts, and gift certificates.

Embodiments

FIG. 1 is a schematic block diagram of a functional configuration of a paper sheet processing apparatus according to an embodiment of the present invention. A paper sheet processing apparatus 10 includes a paper sheet recognition sensor 11, a paper sheet transporting unit 12, a number recognizing unit 13, a display unit 14, an operating unit 15, a ROM (Read Only Memory) 16, a RAM (Random Access Memory) 17, a communication interface (hereinafter, I/F) unit 18, and a controller 19.

The paper sheet recognition sensor 11 has a function for reading an image of a taken-in banknote by using an optical reader to check a serial number of the banknote taken in the paper sheet processing apparatus 10. The actual paper sheet processing apparatus 10 includes various types of banknote recognition sensors, for example, a sensor for detecting thickness of the banknote (thickness sensor) and authentication sensors such as a magnetic sensor and an ultraviolet sensor, other than those of the paper sheet recognition sensor 11. However, in the present embodiment, because judgment of a serial number is its main purpose, illustrations and explanations of means other than an optical reader required for reading serial numbers will be omitted. The paper sheet recognition sensor 11 may be referred to as "an image reader".

Figures 1, 4:
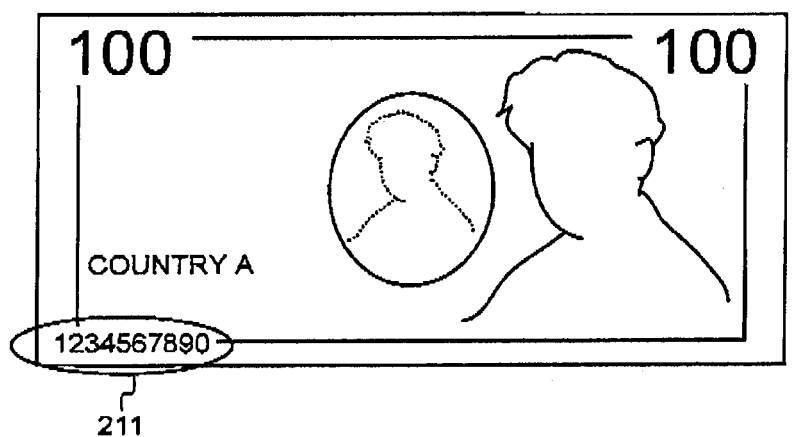
Figures 2, 4:
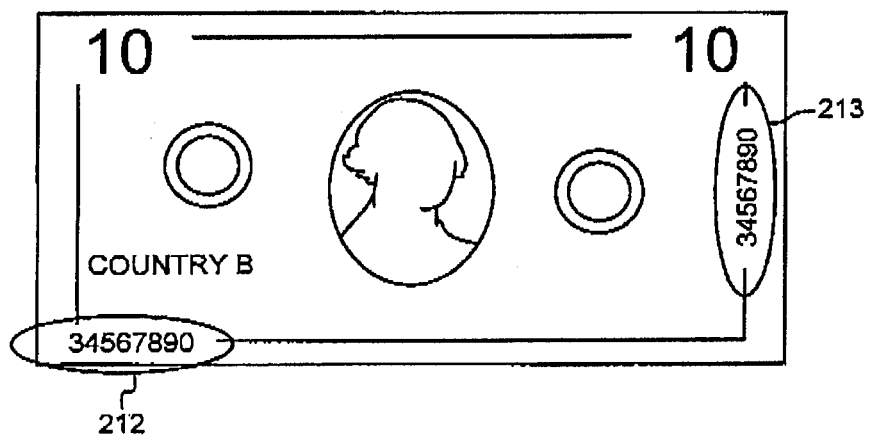

FIG. 2 is a schematic diagram of a configuration example of the paper sheet recognition sensor. As shown in FIG. 2, the paper sheet recognition sensor 11 includes a first line sensor 110 that reads an image on one surface of an input banknote 200 by visible light, a second line sensor 120 that reads an image on the other side of the input banknote 200 by visible light, and an emission controller 130 that controls lighting of a reflective light sources in the first and second line sensors 110 and 120.

The first line sensor 110 includes a reflective light source 111 that irradiates light of a predetermined wavelength to one face of the banknote 200, a lens 112 that collects the light reflected from the banknote 200 when the reflective light 111 source emits the light on it and, a light receiving unit 113 that converts the light collected by the lens 112 to an electric signal, an A/D converter 114 that converts the electric signal converted by the light receiving unit 113 to digital values, and a blocking unit 115 that blocks the light from a reflective light source 121 in the second line sensor 120 described later during read by the light receiving unit 113.

The second line sensor 120 also includes the reflective light source 121 that irradiates light of a predetermined wavelength to the other face of the banknote 200, a lens 122 that collects the light reflected from the banknote 200 when the reflective light source 121 emits the light on it, a light receiving unit 123 that converts the light collected by the lens 122 to an electric signal, an A/D converter 124 that converts the electric signal converted by the light receiving unit 123 to digital values, and a blocking unit 125 that blocks the light from the reflective light source 111 in the first line sensor 110 during read by the light receiving unit 123.

It is desired to use an LED (Light Emitting Diode) as the reflective light sources 111 and 121 in the first and second line sensors 110 and 120. Specifically, to read banknotes used in various countries or regions, it is desired to have red, green, and blue LEDs capable of emitting visible light of an arbitrary wavelength. In the present embodiment, because recognition of the serial number is performed by using a reflected image, only the reflective light sources 111 and 121 are shown. However, an infrared reflective light source and a transmissive light source of visible light or infrared light can be included for checking the authenticity or fitness of the banknote.

When the banknote is taken in, the emission controller 130 controls lighting of the reflective light sources 111 and 121 in the first and second line sensors 110 and 120. The above is an example of the configuration of the paper sheet recognition sensor 11.

The paper sheet transporting unit 12 has a function for transporting the banknote from a banknote receiving unit (not shown) that receives the banknote from outside, recognizing the banknote based on results acquired by the number recognizing unit 13, and a denomination identifying unit 191 and an authentication unit 192 in the controller 19 described later, and transports the banknote to a storing unit (not shown).

The number recognizing unit 13 performs image processing for recognizing the serial number, a recognizing process and a matching process of the image-processed serial number with respect to the taken-in banknote, of which denomination has been identified by using the image of the banknote read by the paper sheet recognition sensor 11, based on an instruction from the controller 19, and returns a recognition result and a matching result to the controller 19. The number recognizing unit 13 includes a number-attribute information memory 131, an authentication condition memory 132, a counterfeit note number memory 133, an image processing unit 134, a character recognizing unit 135, and a matching unit 136. The number recognizing unit 13 stores a program for achieving a function described later in the ROM 16 and expands the program in the RAM 17, so that a CPU (Central Processing Unit) can execute the program, or can be carried out by an FPGA (Field Programmable Gate Array) or the like for achieving high speed for partial processing. The image processing unit 134, the character recognizing unit 135, and the matching unit 136 in the number recognizing unit 13 may be collectively referred to as "an image processing unit/character recognizing unit".

The number-attribute information memory 131 clips the serial number and recognizes the character, and stores number attribute information associated with the number of the banknote required for authenticating the recognized serial number. The number attribute information includes number clipping conditions including a position of the serial number and a clipping size for each denomination and a character clipping ratio, character-font recognition information including a character font, and number recognition conditions including priority to predetermined position, size change, and presence of rotation. The type of the reflected image to be used corresponding to printed color of the banknote and color of the serial number can be stored as the number attribute information.

The "position of the serial number" in the number clipping conditions indicates the position of the serial number for recognizing the banknote, printed on the banknotes of the respective denominations. For example, it is indicated by a coordinate position of the serial number, using a predetermined position on the banknote (for example, upper left corner) as an origin. When a plurality of serial numbers are printed on the banknote, printing positions of all the serial numbers are stored. The "clipping size" indicates a clipping size of the serial number (character string) printed at the "position of the serial number". The "character clipping ratio" indicates an aspect ratio at the time of clipping a character forming the serial number in a segmentation process described later.

A character font used for the serial number of the banknote is stored in the "character font" in the character-font recognition information. An area in which the character-font recognition information is stored in the number-attribute information memory 131 may be referred to as "a font-recognition information memory".

FIG. 3 is an example of the number recognition conditions. The number recognition conditions include respective items of "currency type", "denomination", "priority to predetermined position", "size change", and "rotation". It is set here with respect to respective denominations of the kinds of banknote whether respective items of "priority to predetermined position", "size change", and "rotation" are set.

"Currency type" indicates the type of currency to be recognized by the paper sheet processing apparatus 10 installed. The banknotes are sorted by country or region such as US dollar, Euro, Japanese yen, Chinese yuan, and Singapore dollar as the currency type. The "denomination" is an item indicating kinds of the banknote in a certain country or region. For example, the denominations of Japanese yen are the kinds of banknotes sorted as 1,000-yen note, 2,000-yen note, 5,000-yen note, and 10,000-yen note.

"Priority to predetermined position" is an item for setting whether or not a plurality of serial numbers are printed on one face of the banknote, and whether or not judgment is to be performed for all the serial numbers when the serial numbers are printed. "YES" and "NO" can be set herein.

"YES" in the priority to predetermined position indicates that judgment of the banknote in which only one serial number is printed on one face is performed or that judgment of only the serial number at a predetermined position is performed, although a plurality of serial numbers are printed on one face. "NO" indicates that when a plurality of serial numbers is printed on one face, all the serial numbers are judged. FIG. 4-1 and FIG. 4-2 schematically depict an example of the banknote. In FIG. 4-1, an example of the banknote in which serial number 211 is printed at one position on the lower left corner of one face (surface) is shown. In FIG. 4-2, an example of the banknote in which serial numbers 212 and 213 are printed at two positions on the lower left corner and on the right end of one face (surface) is shown. The serial number 213 on the right end is printed in a direction rotated by 90 degrees counterclockwise with respect to the serial number 212 on the lower left corner.

In the case of "NO" in the priority to predetermined position, the two serial numbers 212 and 213 shown in FIG. 4-2 are to be judged, and in the case of "YES" in the priority to predetermined position, the serial number 211 of the banknote shown in FIG. 4-1 or any one of the two serial numbers 212 and 213 of the banknote shown in FIG. 4-2 is to be judged. It can be set to read the serial number at a predetermined position on a predetermined face of the banknote preferentially at all times, as a method to determine a priority position in the case of "YES" in the priority to predetermined position. In this case, for example, in the banknote shown in FIG. 4-2, it is set to read the serial number 212 on the lower left on the surface of the banknote at all times. An order of priority of a position for reading the serial number can be set according to another setting method, and for example, a serial number having a higher recognition ratio among all serial numbers 212 and. 213 can be preferentially read.

Figure 5:
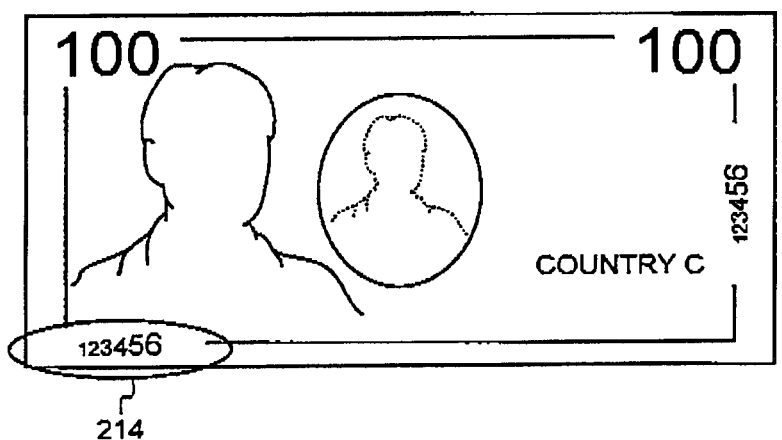
FIG. 5 is a schematic diagram of an example of a banknote in which a serial number is printed in different character sizes.

"Size change" is an item for setting whether or not the banknote in which the printed serial number is printed in different character sizes is to be judged. "YES" and "NO" can be set as the size change. In the case of "YES" in the size change, a banknote in which the serial number is printed in different character sizes is to be judged. In the case of "NO", a banknote in which the serial number is printed in characters of the same size is to be judged. FIG. 5 is a schematic diagram of an example of the banknote in which the serial number is printed in different character sizes. As shown in FIG. 5, when the serial number 214 is printed in different character sizes, "YES" is set in the size change. Further, in the case of FIGS. 4-1 and 4-2, because the serial numbers 211 to 213 are printed in characters of the same size, "NO" is set in the size change.

"Rotation" is an item for setting whether or not to perform rotation when an orientation of the read serial number is not a predetermined orientation. "YES" and "NO" can be set as rotation. In the case of "YES" in the rotation, when the character in the image of the clipped serial number is not in the predetermined orientation, processing for rotating the image to face in the predetermined orientation is performed. In the case of "NO", there is no need to rotate the clipped serial number, because the characters in the image thereof face the predetermined orientation. For example, in the case of the serial number 211 in FIG. 4-1 and the serial number 212 in FIG. 4-2, "NO" is set in the rotation, because the orientation of the clipped characters faces upward. When the orientation of the clipped characters is left-pointing like the serial number 213 in FIG. 4-2, "YES" is set in the rotation, because the characters need to face upward by rotating the characters by 90 degrees clockwise.

An area in which the number recognition conditions are stored in the number-attribute information memory 131 may be referred to as "a number-recognition condition memory".

The authentication condition memory 132 stores authentication conditions, which are conditions for performing judgment relating to the serial number of the banknote. The authentication conditions can include "multiple-matching", which is an item indicating whether or not to perform matching between the read serial numbers when judgment of the "kind of a banknote" and "denomination" indicating the kind of the banknote to be judged, or judgment of a plurality of serial numbers is performed, "number of matched characters" indicating a matching degree with serial numbers of banknotes judged to be counterfeit notes (hereinafter, "serial number of the counterfeit note"), which becomes a reference at the time of judgment as a counterfeit note, and "character font difference" indicating whether or not the banknote used in one country or region is printed by using a plurality of character fonts.

The authentication conditions including these items are set by a user by using the operating unit 15 and the display unit 14 or via the communication I/F unit 18. To facilitate a setting operation by the user, conditions in which set values of the above items are variously changed with respect to one denomination are held in a table format, and the user can select authentication conditions close to an actual operation among these, and according to circumstances, customize the selected authentication conditions via the operating unit 15 or via the communication I/F unit 18 from outside such as a higher-ranking terminal, and set the customized conditions as the authentication conditions. In the present embodiment, such a case is explained as an example.

FIG. 6 is an example of the authentication conditions. The authentication conditions include the respective items of "currency type", "denomination", "multiple-matching", "number of matched characters" and "character font difference". "Currency type" and "denomination" are the same as those explained in the number recognition conditions in FIG. 3, "currency type" indicates a type of currency for which recognition is performed by the paper sheet processing apparatus 10 installed, and "denomination" indicates a kind of banknote used in a currency of a certain country or region.

"Multiple-matching" is an item for setting whether or not to judge whether a plurality of read serial numbers on the banknote coincides with each other, when the serial numbers are printed on the banknote and the priority to predetermined position in the number recognition conditions is "NO". "YES and "NO" can be set herein. "YES" in the multiple-matching indicates to judge whether or not all the serial numbers coincide with each other when the priority to predetermined position is "NO". "NO" in the multiple-matching indicates not to perform the multiple-matching, because only one serial number is read when the priority to predetermined position is "NO" and matching for a plurality of serial numbers is not performed, or when the priority to predetermined position is "YES". In the "multiple-matching", not only matching between a plurality of serial numbers on one face of the banknote, but also matching between a plurality of serial numbers printed on two sides of the banknote can be performed.

The "number of matched characters" is an item for setting the number of matched digits (number of matched characters) when the banknote to be judged is judged as a counterfeit note by comparing the number of digits (number of characters) of the serial number on the banknote to be judged with the serial numbers of the counterfeit notes stored in the counterfeit note number memory 133 in the authentication. The "number of matched characters" is set by the higher-ranking terminal via the operating unit 15 and the communication I/F unit 18 by the user. The number of matched characters may be referred to as "the reference number of matched characters".

A case of a banknote having a 10-digit serial number is exemplified. When the number of matched characters is set to "ten characters", a banknote to be checked is judged as a counterfeit note when ten characters in the serial number of the banknote completely coincide with ten characters in the serial number of a counterfeit note including an order thereof. Accordingly, even if 9-digit characters of ten digits coincide with the serial number of the counterfeit note, the banknote is not judged as a counterfeit note. When the number of matched characters is set to "eight characters", a banknote to be checked is judged as a counterfeit note when the serial number of the banknote coincides with the serial number of a counterfeit note by eight digits or more of ten digits of characters. That is, when 8-digit characters of 10-digit characters coincide with those of the counterfeit note, the banknote is judged as a counterfeit note, however, when 7-digit characters of 10-digit characters coincide with those of the counterfeit note, the banknote is not judged as a counterfeit note—In recognition of the serial number, there is a matching rate, which is a rate of matching between a serial number of a banknote to be judged and the serial number of a counterfeit note, as substantially the same idea as the number of matched characters, and the matching rate can be used instead of the number of matched characters.

"Character font difference" is an item for indicating whether or not there is a plurality of kinds of banknote printed in a different font with respect to one banknote, in the banknotes used in one country or region. "YES" and "NO" can be set as the character font difference. That is, "YES" in character font difference is set in a place where a plurality of kinds of banknote printed in a different font such as Euro is used, and "NO" is set in a place where only the banknotes printed in the same character font are used. In the case of "YES" in character font difference, a plurality of character fonts are registered with respect to one denomination in the character-font recognition information in the number-attribute information memory 131.

In the above explanations, the "number of matched characters" is for judging a banknote to be a counterfeit note when the serial number of the banknote to be judged coincides with the serial number of a counterfeit note by certain number of digits. However, "number of matched characters" can be also set at the time of performing a matching process for a plurality of numbers in the case of "YES" in multiple-matching. In this case, when fewer than the predetermined number of digits of a serial number at one position in a banknote coincide with a serial number at another position, the banknote printed with these serial numbers is judged to be a counterfeit note. The number of matched characters to be set at this time may be referred to as "the reference number of matched characters".

As shown in FIG. 6, when a plurality of authentication conditions are stored in a table format in the authentication condition memory 132, the authentication conditions are set in the authentication unit 192 from these conditions. In this explanation, the number recognition conditions in FIG. 3 and the authentication conditions in FIG. 6 are stored respectively in the number-attribute information memory 131 and the authentication condition memory 132; however, the recognition conditions in FIG. 3 and the authentication conditions in FIG. 6 can be stored together.

The counterfeit note number memory 133 stores the serial number judged as a counterfeit note or recognized as a counterfeit note by the user (counterfeit-note serial number) associated with the banknote. The counterfeit-note serial number is input by the user via the operating unit 15 or set by the higher-ranking terminal via the communication I/F unit 18.

The image processing unit 134 clips the position and size of a serial number portion from a reflected image read by the paper sheet recognition sensor 11 based on the number clipping conditions and the number recognition conditions in the number-attribute information memory 131, by using a denomination identification result including the denomination and the orientation of the taken-in banknote acquired by the controller, to perform required image processing.

Specifically, the image processing unit 134 acquires the position and clipping size of the serial number corresponding to the denomination identification result received from the controller from the number clipping conditions, and clips a slightly larger partial image including the serial number portion from the read reflected image of the banknote by using the position and clipping size of the serial number. In the case of "NO" in priority to predetermined position in the number recognition conditions, the serial numbers at the respective positions on the banknote are clipped based on a serial number clipping position. In the case of "YES" in priority to predetermined position and a banknote in which a plurality of serial numbers are printed on one face, the serial number is clipped based on the serial-number clipping position at a preset position (hereinafter, "preferential position") in the number recognition conditions. When the clipped partial image has a different orientation from that of the banknote as shown by serial number 213 in FIG. 4-2, a rotation process for rotating the clipped partial image needs to be performed. For example, in the case of serial number 213 in FIG. 4-2, the partial image is rotated by 90 degrees clockwise. In this case, "YES" can be set in the item of rotation in the number recognition conditions stored in the number-attribute information memory 131. Setting of "YES" and "NO" in the item of rotation can be set arbitrarily.

Furthermore, the segmentation process for recognition between characters is performed for the clipped partial image, and respective characters constituting the serial number are clipped. At the time of clipping the respective characters by the segmentation process, the characters are clipped so that an aspect ratio (length) becomes a predetermined ratio preset according to the kind of the banknote. The aspect ratio at the time of clipping is stored in the number clipping conditions in the number-attribute information memory 131 as a "character clipping ratio".

Figure 7:
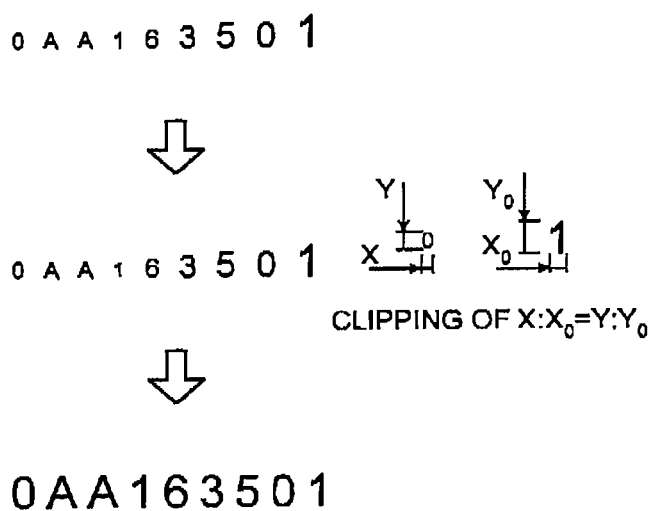
FIG. 7 is an example of processing of serial numbers of which characters are in different sizes.

Further, the image processing unit 134 also has a function for changing the size of the respective characters constituting the clipped serial number. When "YES" is set in the item of size change in the number recognition conditions in the number-attribute information memory 131, the image processing unit 134 changes the size of the character in the clipped serial number. FIG. 7 is an example of processing of serial numbers in different sizes. Horizontal and vertical lengths X and Y of the respective characters in the serial numbers having different sizes clipped by the image processing unit 134 are measured (X:Y is the preset predetermined ratio (character clipping ratio in the number clipping conditions)). A character having a desired size of the characters in the serial number is selected as a reference character, and horizontal and vertical lengths (clipped length) thereof are designated as $X_o$ and $Y_o$. The reference character can be arbitrarily set according to resolution of the reflected image and the like; however, in this example, the largest character is designated as the reference character.

Horizontal and vertical lengths of the character are then respectively scaled at the same ratio so that the characters other than the reference character have substantially the same size as that of the reference character. In this example, it is assumed that the respective characters are enlarged by $X_o/x$ ($=Y_o/Y$) times at the same ratio horizontally and vertically. Accordingly, as shown in FIG. 7, the characters other than the reference character are enlarged to have substantially the same size as that of the reference size. In the case of "NO" in the item of size change in the number recognition conditions, the image processing unit 134 does not change the size of the serial number. In the above example, the largest character is selected as the reference character; however, any character can be selected so long as the character can be recognized in the matching process performed by the matching unit 136 described later. In this case, other characters are scaled to be matched with the reference character. A scaling ratio can be stored beforehand, or the size of the character suitable for recognition can be stored beforehand, and the size of the character can be changed by using the stored size.

The character recognizing unit 135 performs character recognition with respect to the serial number clipped by the image processing unit 134 or further rotated or size-converted. Specifically, the character recognizing unit 135 recognizes the respective characters in the serial number recognizable by the image processing unit 134 based on a denomination identification result by the controller 19, that is, comparing and matching with the character fonts in the character-font recognition information set with respect to the same kind of banknote in the number-attribute information memory 131 are performed. When "NO" is set in the "character font difference" in the authentication conditions stored in the authentication condition memory 132, the character recognizing unit 135 needs only to recognize the respective characters in the serial number. A recognition rate of the enlarged characters can be increased by performing the matching process by using a template for the enlarged character. In addition to such a characteristic recognizing process, only a feature quantity is calculated at the time of recognizing the respective characters, and font recognition by using the character-font recognition information can be performed based on the calculated feature quantity of the character by another processing unit.

The image processing unit 134 and the character recognizing unit 135 correspond to "image processing unit/character recognizing unit" in the claims.

The matching unit 136 performs matching for authentication using the serial number with respect to the serial number subjected to character recognition by the character recognizing unit 135, and includes a counterfeit note-number matching function 1361 and a multiple-numbers matching function 1362.

The counterfeit note-number matching function 1361 performs a judgment whether or not a serial number of a paper sheet matched has a number equal to or more than a predetermined number of matched characters stored in the counterfeit note number memory 133 when the serial number is recognizable in matching to counterfeit-note serial numbers by the image processing unit 134. Instead of the number of matched characters, a matching ratio may be also available.

The multiple-numbers matching function 1362 is for matching the serial numbers subjected to character recognition to each other at a plurality of positions on the banknote to judge whether or not these serial numbers coincide with each other, when "YES" is set in the item of multiple-matching in the authentication conditions stored in the authentication condition memory 132.

The display unit 14 has a function for displaying a setting screen at the time of setting the authentication conditions based on a display program, and includes a liquid crystal display or the like. At the time of normal operation, the display unit 14 displays various pieces of information such as operation information, processing information including the number of banknotes processed and a total amount, the state of the apparatus, and the like to an operator of the paper sheet processing apparatus.

The operating unit 15 sets the number attribute information in the number-attribute information memory 131 (number clipping conditions, character-font recognition information, and number recognition conditions), the authentication conditions in the authentication condition memory 132, and the counterfeit-note serial numbers in the counterfeit note number memory 133 in the paper sheet processing apparatus 10. Specifically, when the authentication conditions are input by the user based on the setting screen of the authentication conditions displayed on the display unit 14, the operating unit 15 stores the input authentication conditions in the authentication condition memory 132 of the number recognizing unit 13. When the serial-number recognition information is input by the user based on the setting screen of the serial-number recognition information, the operating unit 15 stores the serial-number recognition information in the number-attribute information memory 131 of the number recognizing unit 13. Further, when the counterfeit-note serial number is input by the user based on the setting screen of the counterfeit note number information, the operating unit 15 stores the counterfeit-note serial number in the counterfeit note number memory 133 of the number recognizing unit 13. At the time of normal operation, the operating unit 15 is used when processing of the paper sheet processing apparatus 10 or processing for operation control (selection of various modes such as processing start, counting, or fitness sorting) is performed. The operating unit 15 may be referred to as "a recognition-condition setting unit" or "an authentication-condition setting unit".

The ROM 16 stores a control program associated with general operation of the paper sheet processing apparatus 10, and stores information (for example, reference feature information and a recognition program) used when the controller 19 recognizes the banknote by using various banknote recognition sensors. The RAM 17 is used as a temporary work area when the paper sheet processing apparatus 10 performs various types of processing.

The communication I/F unit 18 performs a communication function via a communication line between the paper sheet processing apparatus 10 and an information processing terminal. When the paper sheet processing apparatus 10 is connected to another information processing terminal, the paper sheet processing apparatus 10 is normally connected to a higher-ranking apparatus via the communication line. The higher-ranking apparatus can set the number attribute information in the number-attribute information memory 131, the authentication conditions in the authentication condition memory 132, and the counterfeit-note serial number in the counterfeit note number memory 133.

The controller 19 controls respective processing units associated with the paper sheet recognition sensor 11, the paper sheet transporting unit 12, the number recognizing unit 13, the display unit 14, the operating unit 15, the ROM 16, and the RAM 17. The controller 19 includes the denomination identifying unit 191 that identify the denomination based on, for example, the information of the reflected image read by the paper sheet recognition sensor 11, and the authentication unit 192 that authenticates the banknote of the denomination identified by the denomination identifying unit 191.

The denomination identifying unit 191 denominates the denomination including an orientation of the banknote by using the reflected image read by the paper sheet recognition sensor 11. The authentication unit 192 authenticates the taken-in banknote based on a processed result with respect to the paper sheet recognition sensor, processed results with respect to the thickness sensor, the magnetic sensor, and the ultraviolet sensor, and a result of processing performed by the number recognizing unit 13 with respect to the serial number.

The paper sheet processing apparatus 10 having the configuration described above can perform recognition of the serial number of the banknote corresponding to various purposes by setting the authentication conditions, in which a judgment reference and a judgment method are combined for different purposes, in the authentication condition memory 132.

Figure 8:
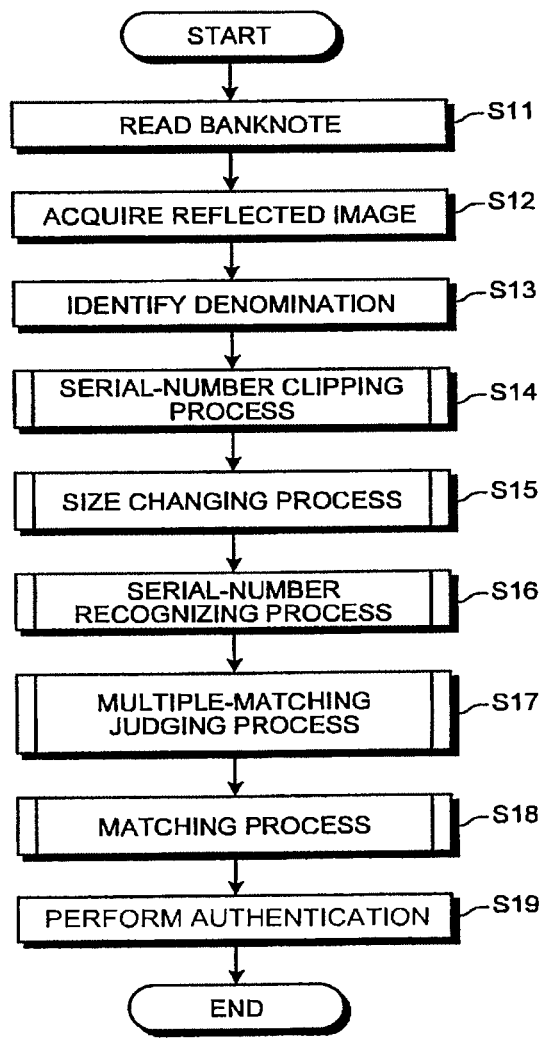
FIG. 8 is a flowchart of an example of an entire process procedure in a paper sheet processing method.
Figure 9:
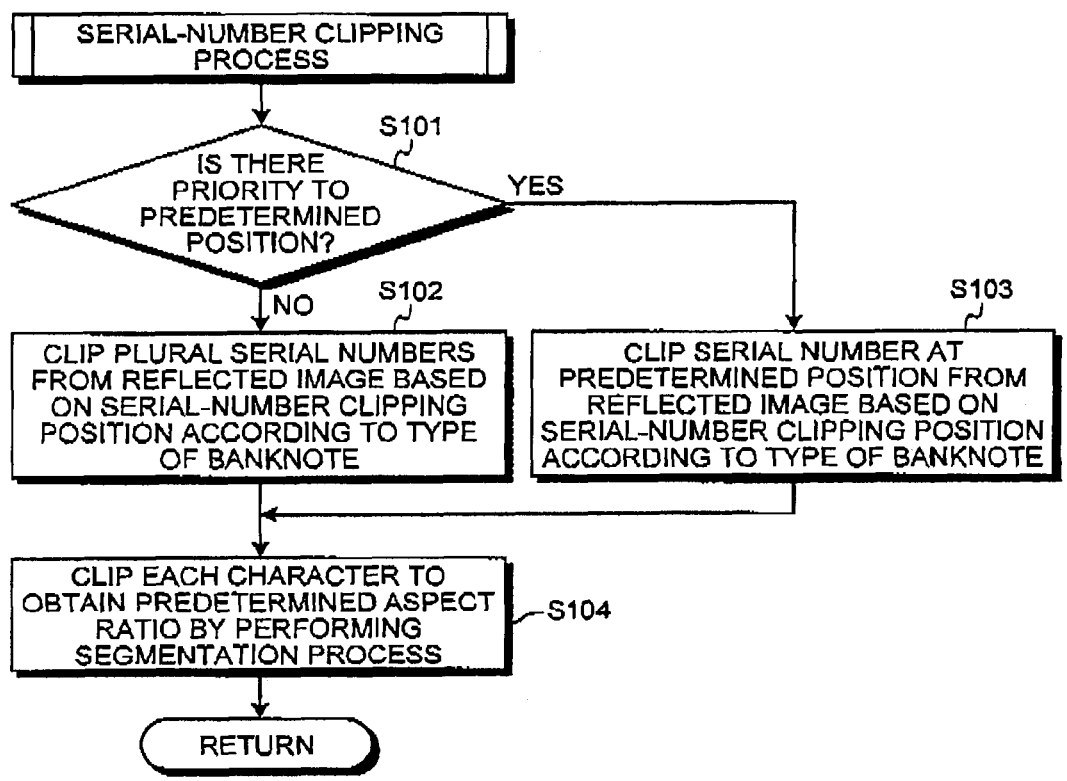
FIG. 9 is a flowchart of an example of a serial-number clipping process procedure in FIG. 8.
Figure 10:
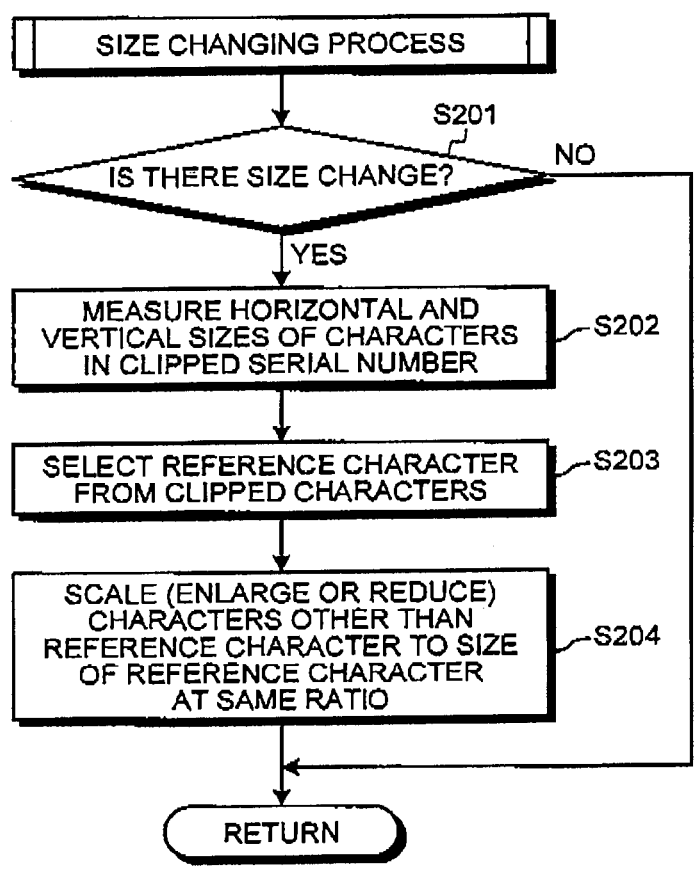
FIG. 10 is a flowchart of an example of a size-change process procedure in FIG. 8.
Figure 11:
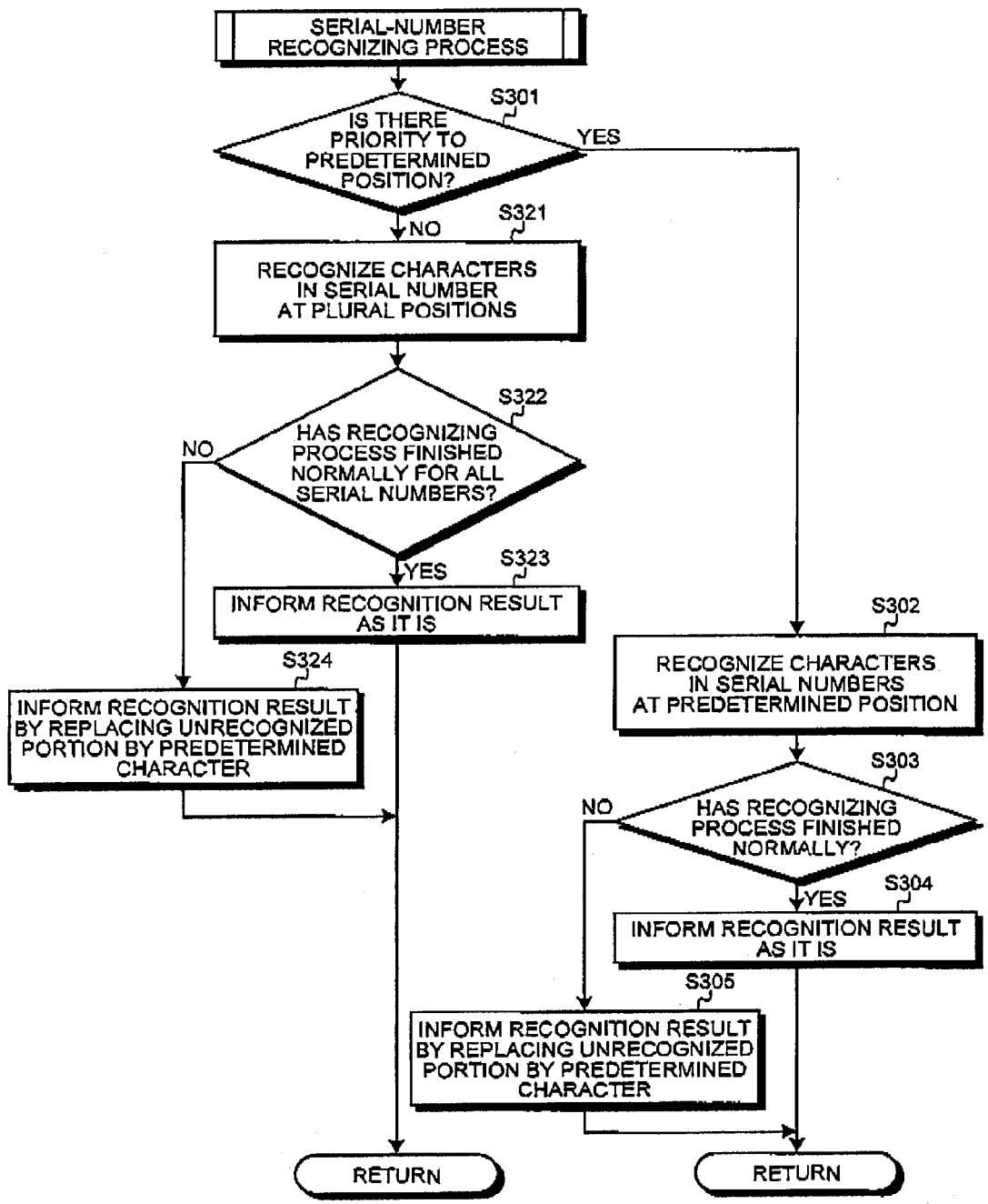
FIG. 11 is a flowchart of an example of a serial 1 number recognition process procedure in FIG. 8.
Figure 12:
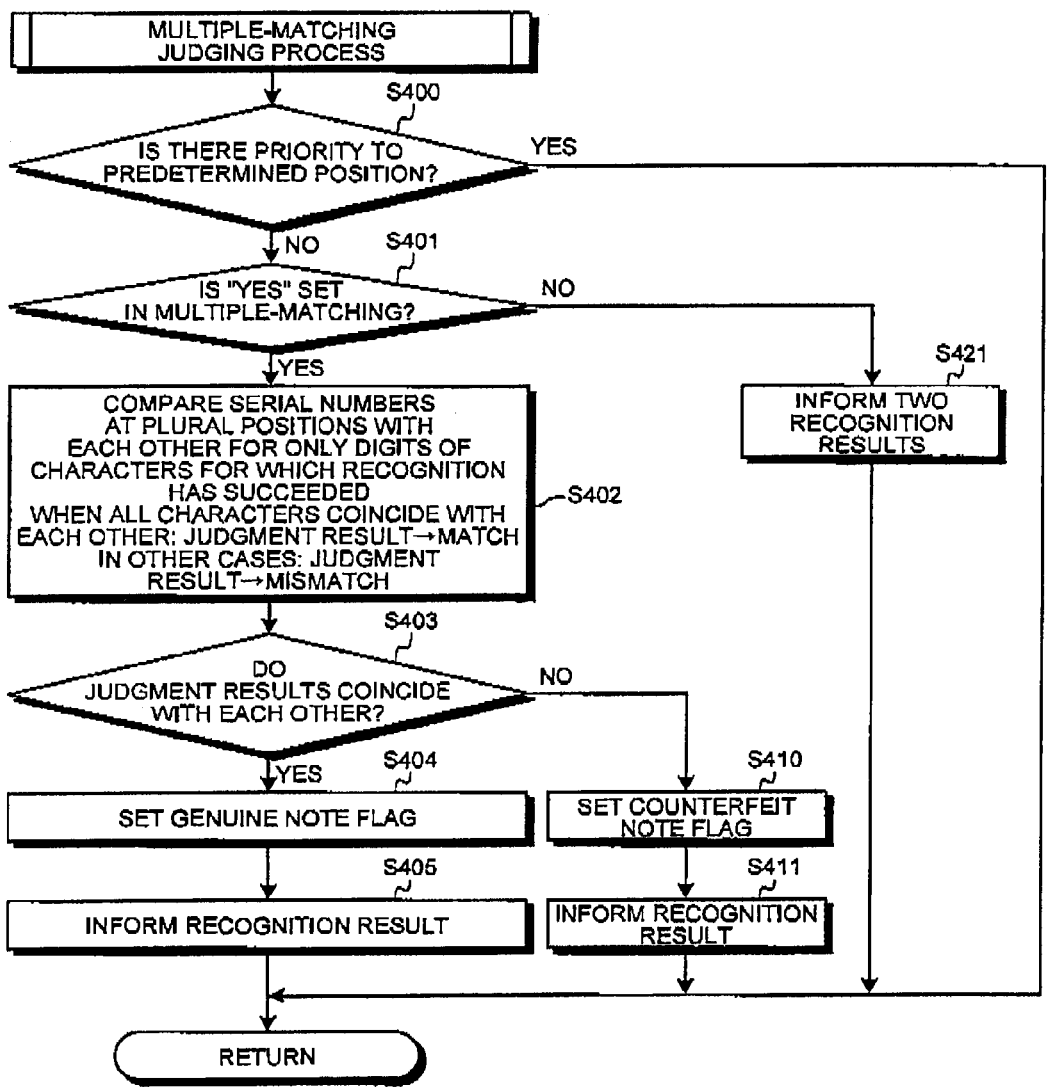
FIG. 12 is a flowchart of an example of a multiple-matching process procedure in FIG. 8.

A recognition method of the banknote in the paper sheet processing apparatus 10 is explained next. FIGS. 8 to 13 are flowcharts of an example of a process procedure in a paper sheet processing method. FIG. 8 is a flowchart of an example of the entire process procedure in the paper sheet processing method. FIG. 9 is a flowchart of an example of a serial-number clipping process procedure in FIG. 8. FIG. 10 is a flowchart of an example of a size change process procedure in FIG. 8. FIG. 11 is a flowchart of an example of a serial-number recognition process procedure in FIG. 8. FIG. 12 is a flowchart of an example of a multiple-matching process procedure in FIG. 8, and FIG. 13 is a flowchart of an example of a matching process procedure in FIG. 8.

An outline of a process procedure in the paper sheet processing method is explained first with reference to FIG. 8. When the banknote is taken in to the paper sheet processing apparatus 10, as shown in FIG. 8, the paper sheet recognition sensor 11 reads the banknote being transported (Step S11), to acquire a reflected image of a predetermined wavelength of both sides of the taken-in banknote (Step S12). The denomination identifying unit 191 in the controller 19 then identifies the denomination and orientation of the banknote based on the acquired reflected image (Step S13).

Thereafter, the image processing unit 134 in the number recognizing unit 13 clips a serial number portion of the banknote from the image acquired at Step S12 corresponding to conditions set in the number attribute information (number clipping conditions and number recognition conditions) stored in the number-attribute information memory 131 and a condition set in the item of priority to predetermined position of the authentication conditions stored in the authentication condition memory 132, and clips the respective characters constituting the serial number (Step S14). The image processing unit 134 of the number recognizing unit 13 then changes the character size of the serial number on the banknote according to the conditions set in the item of size change in the number recognition conditions (Step S15). The character recognizing unit 135 in the number recognizing unit 13 then performs the serial-number recognizing process for recognizing the respective characters in the clipped or, according to circumstances, size-changed serial number (Step S16). When "NO" is set in the size change, the size changing process is not performed.

The multiple-numbers matching function 1362 of the character recognizing unit 135 in the number recognizing unit 13 then performs a multiple-matching judging process for judging whether the serial numbers coincide with each other at a plurality of positions on the taken-in banknote, when "YES" is set in the multiple matching in the authentication conditions (Step S17). The counterfeit note-number matching function 1361 of the matching unit 136 then performs a matching process for judging whether or not characters in respective digits of a plurality of serial numbers on the banknote in the case of selecting multiple-matching, or characters in the respective digits of the serial number at a predetermined position (a preferential position) on the banknote in other cases coincide with the characters in the respective digits of the counterfeit-note serial numbers stored in the counterfeit note number memory 133, by referring to the item of multiple-matching in the authentication conditions (Step S18). At this time, the counterfeit note number matching function 1361 performs authentication of the banknote to be checked by judging whether or not the clipped serial number coincides with the counterfeit-note serial number by the number of characters set in the item of number of matched characters in the authentication conditions.

The authentication unit 192 in the controller 19 performs an authentication process of the taken-in banknote; taking into consideration the result acquired by the paper sheet recognition sensor 11 such as the magnetic sensor and the ultraviolet sensor and the result of the multiple-matching judging process at Step S17 and the matching process at Step S18 (Step S19), to thereby finish the process in the paper sheet processing method. When it is intended to recognize the serial number on the banknote, after the serial number on the banknote is recognized by the serial-number recognizing process at Step S16, the process may be finished without performing the processes at Steps S17 to S19.

Details of the serial-number clipping process at Step S14 in FIG. 8 are explained next. First; the image processing unit 134 in the number recognizing unit 13 judges whether or not "YES" is set in the item of "priority to predetermined position" in the number recognition conditions stored in the number-attribute information memory 131 (Step S101). When "NO" is set in the item of "priority to predetermined position" (NO at Step S101), the image processing unit 134 clips the serial numbers at a plurality of positions from the reflected image, based on the denomination acquired from the denomination identifying unit 191 in the controller 19, the denomination identification result including the orientation thereof, the serial-number clipping position and the clipping size corresponding to the kind of the banknote (denomination) in the number clipping conditions stored in the number-attribute information memory 131 (Step S102). When there is only one serial number on the face or rear face of the banknote, one serial number portion is clipped at Step S102.

On the other hand, when "YES" is set in the item of "priority to predetermined position" at Step S101 (YES at Step S101), the image processing unit 134 clips the serial number at the predetermined position from the reflected image, based on the denomination acquired from the denomination identifying unit 191 in the controller 19, the denomination identification result including the direction thereof, the serial-number clipping position and the clipping size corresponding to the kind of the banknote in the number clipping conditions stored in the number-attribute information memory 131 (Step S103).

Thereafter, or after Step S102, when the orientation of the clipped serial number is different from that of the banknote (when "YES" is set in the rotation in the number recognition conditions), the image processing unit 134 performs a rotation process so that the orientation of the serial number is matched with the orientation of the banknote. Thereafter or when the orientation of the clipped serial number is the same as that of the banknote, the image processing unit 134 executes the segmentation process for recognition between the characters of the clipped serial number, and clips the respective character portions of the serial number so as to have a predetermined aspect ratio (Step S104). Accordingly, the serial-number clipping process is finished and control returns to the flowchart in FIG. 8.

Details of a size changing process at Step S15 in FIG. 8 are explained next with reference to FIG. 10. First, the image processing unit 134 in the number recognizing unit 13 judges whether or not "YES" is set in the item of "size change" in the authentication conditions (Step S201). When "YES" is set in the item of "size change" (YES at Step S201), the image processing unit 134 measures horizontal and vertical sizes X and Y of the clipped character for the respective characters in the clipped serial number (Step S202). The image processing unit 134 then selects a reference character from the respective characters of the clipped serial number (Step S203). The horizontal and vertical sizes of the selected reference character are designated as $X_o$ and $Y_o$. The characters other than the reference character are scaled (enlarged or reduced) by $X_o/X$ ($=Y_o/Y$) times so that the characters have the same size as that of the reference character (Step S204).

For example, as shown in FIG. 7, when the rightmost character "1" having the largest size is designated as the reference character, sizes of other characters are enlarged, matched with the size of reference character "1". At this time, the characters are scaled according to a value obtained by dividing the horizontal or vertical length of the reference character by the horizontal or vertical length of the character to be enlarged. Accordingly, as shown in FIG. 7, a serial number in which the characters having the same size are arranged can be acquired. Accordingly, the size change size changing process is finished and control returns to the flowchart in FIG. 8. The reference character may be determined beforehand and the size of other characters may be changed to the size of the reference character.

At Step S201, when "NO" is set in the item of "size change" (NO at Step S201), the process is finished without performing the size changing process of the respective characters in the serial number printed on the taken-in banknote, and control returns to FIG. 8.

Details of the serial-number recognizing process at Step S16 in FIG. 8 are explained next with reference to FIG. 11. First, the character recognizing unit 135 in the number recognizing unit 13 judges whether or not "YES" is set in the item of "priority to predetermined position" in the number recognition conditions stored in the number-attribute information memory 131 (Step S301). That is, the character recognizing unit 135 judges whether or not the recognizing process or the matching process is to be performed for only one serial number at a predetermined position in the reflected image of the banknote, or the recognizing process or the matching process is to be performed for a plurality of serial numbers in the reflected image of the banknote.

When "YES" is set in the item of "priority to predetermined position" (YES at Step S301), the character recognizing unit 135 recognizes the characters in the serial number at the predetermined position (Step S302). The character recognizing unit 135 recognizes the respective characters in the serial number clipped in the serial-number clipping process shown in FIG. 9.

Thereafter, the character recognizing unit 135 judges whether or not the process has finished normally for the respective characters in the serial number (Step S303). It is assumed that the recognizing process has finished normally when all the characters can be recognized normally, and in other cases, it is assumed that the recognizing process has not finished normally.

When the recognizing process has finished normally (YES at Step S303), the character recognizing unit 135 informs the controller 19 of a recognition result acquired at Step S302 (Step S304) without modification, and the serial-number recognizing process is finished.

When the recognizing process has not finished normally (NO at Step S303), the character recognizing unit 135 informs the controller 19 of a result in which an unrecognizable character is replaced by a predetermined character indicating that the character cannot be
recognized (for example, a character "?" or "*" (hereinafter, "reject character")) for indicating a
recognition failure (Step S305). The serial-number recognizing process is then finished.

On the other hand, at Step S301, when "NO" is set in the item of "priority to predetermined position" (NO at Step S301), the character recognizing unit 135 performs the character recognizing process of the serial numbers at a plurality of positions on the banknote (in the reflected image) (Step S321). The character recognizing process of the serial number is also for judging whether or not the respective characters constituting the serial number can be recognized as at Step S302.

Thereafter, the character recognizing unit 135 judges whether or not the character recognizing process of the serial numbers at the plurality of positions has finished normally (Step S322). When the character recognizing process of the serial number at the positions has finished normally (YES at Step S322), the character recognizing unit 135 informs the controller 19 of the recognition result at Step S321 (Step S323) without modification, and the serial-number recognizing process is finished. When the character recognizing process of the serial number at the positions has not finished normally (NO at Step S322), the character recognizing unit 135 informs the controller 19 of the recognition result in which an unrecognizable portion is replaced by a reject character (Step S324), and the serial-number recognizing process is finished.

At the time of the character recognizing process of the serial number at Step S302 or S321, when "YES" is set in the item of the "character font difference" in the authentication conditions, the character recognizing unit 135 can acquire the character font used for the denomination included in the denomination identification result from the character-font recognition information in the number-attribute information memory 131, to perform the character recognizing process including the character font. When there is only one serial number, a process for recognizing only one serial number is performed.

Details of the multiple-matching judging process at Step S17 in FIG. 8 are explained next with reference to FIG. 12. First, the multiple-numbers matching function 1362 of the matching unit 136 in the number recognizing unit 13 judges whether or not "YES" is set in the item of "priority to predetermined position" in the number recognition conditions in the number-attribute information memory 131 (Step S400). When "NO" is set in the item of "priority to predetermined position" (NO at Step S400), the multiple-numbers matching function 1362 further judges whether or not "YES" is set in the item of "multiple-matching" in the authentication conditions in the authentication condition memory 132 (Step S401).

When "YES" is set in the item of "multiple matching" in the authentication conditions (YES at Step S401), the multiple-numbers matching function 1362 compares the serial numbers at a plurality of positions on the banknote with each other by using only digits of the characters for which recognition has succeeded in the process at Step S323 or S324 of the serial-number recognizing process in FIG. 11 (that is, digits of characters other than the reject character) (Step S402). At this time, when all recognizable characters coincide with each other, the multiple-numbers matching function 1362 determines a judgment result as a match, and in other cases; determines the judgment result as a mismatch. At the time of judgment, the number of characters to be matched between a plurality of serial numbers, which becomes a reference for identifying between match and mismatch, can be changed arbitrarily.

The multiple-numbers matching function 1362 judges whether the judgment results by a comparison between the serial numbers coincide with each other (Step S403). When the judgment results coincide with each other (YES at Step S403), the multiple-numbers matching function 1362 sets a fit note flag indicating that the taken-in banknote is a fit note (Step S404), and informs the controller 19 of the recognition result of the serial number together with the fit note flag (Step S405), thereby finishing the multiple-matching judging process.

When the judgment results do not coincide with each other at Step S403 (NO at Step S403), the multiple-numbers matching function 1362 sets a counterfeit note flag indicating that the taken-in banknote is a counterfeit note (Step S410), and informs the controller 19 of the recognition result of the serial number together with the counterfeit note flag (Step S411), thereby finishing the multiple-matching judging process. The counterfeit note flag is set at Step S410; however, a flag indicating that the taken-in banknote is suspected as a counterfeit note can be set without concluding that it is a counterfeit note.

Further, when "NO" is set in the item of "multiple-matching" (NO at Step S401), the multiple-numbers matching function 1362 informs the controller 19 of two recognition results acquired at Step S323 or S324 in FIG. 11 (Step S421), and the multiple-matching judging process is finished. At the time of informing the controller 19 of the recognition result at Steps S405, S411, and S421, a serial number having less number of reject characters of the serial numbers, that is, the serial number having less number of unrecognizable characters may be informed as a result.

At Step S400, when "YES" is set in the item of "priority to predetermined position" (YES at Step S400), because a plurality of serial numbers are not read, the process is finished without performing the multiple matching judging process. When there is only one serial number, the multiple-matching judging process is not performed.

Details of the matching process at Step S18 in FIG. 8 are explained next with reference to FIG. 13. The counterfeit note-number matching function 1361 of the matching unit 136 selects one of the counterfeit-note serial numbers stored in the counterfeit note number memory 133 (Step S501). At this time, a serial number corresponding to the kind (country or region) of the taken-in banknote is selected as the counterfeit-note serial number to be selected. Thereafter, the characters of respective digits of the character-recognized serial number are compared with characters of respective digits of the selected counterfeit-note serial number (Step S502).

After the comparison, the counterfeit note-number matching function 1361 judges whether or not a number indicating how many characters the serial number of the banknote to be checked coincides with the counterfeit-note serial number for each digit of the characters is equal to or more than a predetermined number of matched characters (Step S503). Instead of the number of matched characters, a matching ratio may be also available. When the number indicating how many characters the serial number of the banknote coincides with the counterfeit-note serial number is equal to or more than the predetermined number of matched characters (YES at Step S503), the counterfeit note-number matching function 1361 judges that the taken-in banknote is a counterfeit note (Step S504). The counterfeit note-number matching function 1361 judges that the banknote is a counterfeit note at Step S504, however, judgment that the banknote is suspected as a counterfeit note can be performed. Accordingly, the matching process is finished.

On the other hand, when the number indicating how many characters the serial number of the banknote coincides the counterfeit-note serial number is less than the predetermined number of matched characters (NO at Step S503), the counterfeit note-number matching function 1361 checks whether or not another counterfeit-note serial number is registered in the counterfeit note number memory 133 (Step S505). Instead of the number of matched characters, a matching rate may be also available. When another counterfeit-note serial number is registered in the counterfeit note number memory 133 (YES at Step S505), the counterfeit-note number matching function 1361 returns to Step S501 to repeat the process. When another counterfeit-note serial number is not registered in the counterfeit note number memory 133 (NO at Step S505), because the clipped serial number does not coincide with any of all the registered counterfeit-note serial numbers, the character recognizing unit 135 judges that the taken-in banknote is a genuine note (Step S506), and the matching process is finished.

In the process shown in FIG. 8 described above, an order of the multiple-matching judging process at Step S17 and the matching process at Step S18 may be permutated, or may be simultaneously performed. In the matching process, when "NO" is set in the item of "priority to predetermined position" in the number recognition conditions, the matching process may be performed for a plurality of serial numbers on the banknote. As shown in FIG. 8, in the case that the multiple-matching judging process is performed before the matching process at Step S18, the matching process needs only to be performed for one of the serial numbers, when the serial numbers coincide with each other in the multiple-matching judging process.

In the paper sheet processing apparatus 10, the serial number of the banknote newly recognized as a counterfeit note can be stored in the number-attribute information memory 131 in the paper sheet processing apparatus 10 as the serial number of the counterfeit note.

According to the present embodiment, in the paper sheet processing using the serial number, a judgment reference and a judgment method of the serial number can be arbitrarily set or changed according to a place where the paper sheet processing is performed. One type of the paper sheet processing apparatus 10 can handle banknotes of a plurality of countries or denominations, and because there is no need to develop a new logic or to add another logic, the development efficiency of the paper sheet processing apparatus 10 can be increased.

In the matching process with the counterfeit-note serial number, because the number of matched characters, which is the reference for judging that a banknote to be checked is a counterfeit note, can be arbitrarily changed, the matching process can be performed according to an intention of an owner or manager of the paper sheet processing apparatus 10.

Further, in the matching process with the counterfeit-note serial number, when a plurality of serial numbers are printed on a banknote, because a match of characters between the serial numbers is performed, counterfeit note patching or pranks can be detected. Further, because recognition is performed by using the serial numbers not at one position but at a plurality of positions, even if there is a character unrecognizable due to stain or the like in the serial number, recognition is performed by using another serial number at another position, thereby enabling to improve the recognition rate.

In the recognizing process of the serial number including characters of different sizes, the respective characters are clipped and segmented, and size change is performed (enlarged or reduced) at the same ratio, thereby enabling to recognize the serial number by using the same procedure as that of the character recognizing process in the normal serial number including characters of the same size.

Further, because the serial number is identified by using the counterfeit-note serial numbers including information of the character font, the paper sheet processing apparatus 10 can deal with recognition and identification of serial numbers of banknotes of all the countries in the world. In the recognizing process, because matching needs only to be performed with the character font to be checked, an algorithm of a clipping process and the segmentation process of a recognition area where the serial number is printed can be the one common to the conventional technique.

Further, in the above explanations, a case that the banknote is processed as a processing target of the paper sheet processing apparatus has been exemplified. However, the paper sheet processing apparatus may be similarly used when other paper sheets such as a check is processed as the processing target. For example, when a check is processed as the processing target of the paper sheet processing apparatus, a check number, number of ABA (American Bank Association), or account number may be used as the number of the paper sheet.

INDUSTRIAL APPLICABILITY

As described above, the paper sheet processing apparatus according to the present invention is useful for a banknote processing apparatus or a check processing apparatus.

The invention claimed is:

1. A paper sheet processing apparatus that performs authentication of a paper sheet, the paper sheet processing apparatus comprising:
an image reader that reads an image of the paper sheet;
an image processing unit that clips images of number portions of the paper sheet from the image of the paper sheet read by the image reader;
a character recognizing unit that recognizes unique numbers printed on the paper sheet from the images of the number portions clipped by the image processing unit;
an authentication condition memory that stores authentication conditions for performing authentication of the paper sheet by using the unique numbers printed on the paper sheet; and a matching unit that performs matching for authenticating the paper sheet based on the authentication conditions stored in the authentication condition memory, wherein the authentication conditions stored in the authentication condition memory comprise a reference number of matched characters indicating a number of matched characters between respective digits of the unique numbers, the reference number is a criterion for judging that the paper sheet is not a counterfeit note, and when the number of matched characters between respective digits of the plurality of unique numbers is equal to or larger than the reference number of matched characters, a multiple-numbers matching function judges that the paper sheet is not a counterfeit note.

2. A paper sheet processing apparatus that performs authentication of a paper sheet, the paper sheet processing apparatus comprising:

an image reader that reads an image of the paper sheet;

an image processing unit that clips an image of a number portion of the paper sheet from the image of the paper sheet read by the image reader;

a character recognizing unit that recognizes a unique number printed on the paper sheet from the image of the number portion clipped by the image processing unit;

an authentication condition memory that stores authentication conditions for performing authentication of the paper sheet by using the unique number printed on the paper sheet;

a matching unit that performs matching for authenticating the paper sheet based on the authentication conditions stored in the authentication condition memory; and a counterfeit note number memory that stores counterfeit note numbers, which are numbers of counterfeit paper sheets, wherein the matching unit has a counterfeit note-number matching function for judging whether the paper sheet is a counterfeit note by matching the unique number printed on the paper sheet with the counterfeit note numbers in the counterfeit note number memory, wherein the authentication conditions stored in the authentication condition memory comprise a reference number of matched characters indicating a number of matched characters between respective digits of the counterfeit note numbers and those of the unique number printed on the paper sheet, the reference number is a criterion for judging that the paper sheet is a counterfeit note, and when the number of matched characters between the respective digits of the unique number printed on the paper sheet and those of the counterfeit note numbers in the counterfeit note number memory is equal to or larger than the reference number of matched characters, the counterfeit note-number matching function judges that the paper sheet is a counterfeit note.

3. The paper sheet processing apparatus according to claim 1, wherein the authentication conditions in the authentication condition memory are sorted for country and/or for kind of paper sheet and stored.

4. The paper sheet processing apparatus according to claim 1, further comprising an authentication-condition setting unit that sets or changes the authentication conditions in the authentication condition memory.

5. The paper sheet processing apparatus according to claim 1, further comprising a communication interface unit that communicates with another information processing terminal connected via a communication line, wherein the authentication conditions set in the authentication condition memory are set or changed by the another information processing terminal via the communication interface unit.

6. A paper sheet processing apparatus that performs authentication of a paper sheet, the paper sheet processing apparatus comprising:

an image reader that reads an image of the paper sheet;

an image processing unit/character recognizing unit that recognizes a unique number printed on the paper sheet from an image read by the image reader, the image processing unit/character recognizing unit comprising an image processing unit that clips an image of a number portion of the paper sheet from an image of the paper sheet read by the image reader, and a character recognizing unit that recognizes the unique number printed on the paper sheet from an image of the number portion clipped by the image processing unit;

an authentication condition memory that stores authentication conditions for performing authentication of the paper sheet by using the unique number printed on the paper sheet;

a matching unit that performs matching for authenticating the paper sheet based on the authentication conditions stored in the authentication condition memory; and a font-recognition information memory that stores font recognition information in which a font used for the unique number printed on a genuine paper sheet is associated with a kind of the paper sheet, wherein a character recognition function of the image processing unit/character recognizing unit further comprises a function for judging whether a font of the recognized unique number printed on the paper sheet is different from font recognition information corresponding to the kind of a paper sheet in the font-recognition information memory.

7. The paper sheet processing apparatus according to claim 6, wherein the authentication conditions stored in the authentication condition memory comprise font difference information indicating whether to discriminate between a font of the paper sheet to be authenticated and that of a genuine paper sheet for a recognizing process performed by the character recognition function using the information stored in the font-recognition information memory.

8. The paper sheet processing apparatus according to claim 2, wherein the authentication conditions in the authentication condition memory are sorted for country and/or for kind of paper sheet and stored.

9. The paper sheet processing apparatus according to claim 2, further comprising an authentication-condition setting unit that sets or changes the authentication conditions in the authentication condition memory.

10. The paper sheet processing apparatus according to claim 2, further comprising a communication interface unit that communicates with another information processing terminal connected via a communication line, wherein the authentication conditions set in the authentication condition memory are set or changed by the another information processing terminal via the communication interface unit.

* * * * *